US005426622A

United States Patent [19]

Orozov

[11] Patent Number: 5,426,622

[45] Date of Patent: Jun. 20, 1995

[54] MULTI-MODE AUDIO IMAGING CONTROL DEVICE HAVING UNITARY CONTROL ELEMENT

[75] Inventor: Borislav L. Orozov, Boca Raton, Fla.

[73] Assignee: Sony Electronics Inc., Park Ridge, N.J.

[21] Appl. No.: 248,287

[22] Filed: May 24, 1994

[51] Int. Cl.[6] .......... G11B 19/00

[52] U.S. Cl. .......... 369/24; 381/1

[58] Field of Search .......... 369/24, 25, 1, 2, 4; 381/1, 2, 103, 5, 120; 330/75, 124 R, 185, 192; 360/18

[56] References Cited

U.S. PATENT DOCUMENTS 3,170,991 2/1965 Glasgal .......... 381/1
4,149,036 4/1979 Okamoto et al. .......... 381/1

OTHER PUBLICATIONS

One page description AMEK-BCIII, BC315-Mono Mic/Line Input, BC318-Stereo Line Input.

One page description Solid State Logic SL5000 M Series.

One page description AMEK CLASSIC—CC118 Stereo Line Input.

One page description Neve MATS—Monitoring and Talkback System, Sasli-Stereo/Auxiliary Line Input, Full Stereo Facilities, and Auxiliaries.

*Primary Examiner*—Ali Neyzari
*Attorney, Agent, or Firm*—Lise A. Rode; Robert P. Biddle; Jerry A. Miller

[57] ABSTRACT

A multi-mode audio imaging control device having unitary control element for use in recording and reproducing of multi-channel audio programs. The imaging control device includes a first channel input and a second channel input, four variable resistors for variably controlling the signal input from the first channel input and the second channel input to the inputs of a first differential amplifier and a second differential amplifier. The four variable resisters are coupled together so as to be simultaneously varied in accordance with a common control mechanism.

25 Claims, 7 Drawing Sheets

MULTI-MODE AUDIO IMAGING CONTROL DEVICE HAVING UNITARY CONTROL ELEMENT

FIELD OF THE INVENTION

The present invention relates to the field of audio imaging control devices for use in stereo recording, or reproducing, systems. More particularly, the present invention relates to an audio imaging control device wherein multiple image modes may be obtained through manipulation of a unitary control element.

BACKGROUND

Audio information such as that representing a musical performance or the like is often recorded to a recording medium for subsequent reproduction in a listening area via an appropriate audio reproduction system. Upon playback, it is often desired that the reproduced sound have an enhanced or lifelike aural quality which gives a listener of the reproduced sound the perception of an original performance. To attain this enhanced aural quality upon playback, multi-channel audio systems are a frequent choice for reproducing recorded audio information since multichannel systems lend themselves to providing greater definition of a perceived "sound stage" or audio "image" upon reproduction. Sound staging and imaging generally refer to the apparent soundstage from which the reproduced sound is perceived to emanate.

In order to take full advantage of the benefits which a multi-channel reproduction system provides in defining a lifelike aural quality upon playback of an audio signal, it is commonly beneficial to process the audio signals prior to being recorded onto the recording medium so that individual sounds can be reproduced within the sound stage in such a way that their position and relative size within the sound stage can be more fully defined. To accomplish this, audio control devices commonly referred to as "imaging controls", "imagers" or "wideness controls" are utilized during the process of recording, or mixing down, audio information. These imaging controls are often incorporated into audio mixing consoles utilized in the recording/mixdown process, or in portable recording equipment, and are used to vary or control the stereo base or image mode of the audio signal. In stereo audio systems, examples of image modes include, for example, "stereo" mode, "reverse stereo" mode, "wide", "reverse wide" mode, "left" mode, "right" mode and "mono", or "monaural", mode. Depending upon the image mode selected, the imaging control will provide for an appropriate level an audio signal to be recorded across each of one or more recording channels of a recording medium, with phase characteristics appropriate for achieving the desired imaging mode effect upon reproduction.

An audio mixing console may include an imaging control for processing the audio signals assigned to each particular audio channel thereof. These imaging controls are generally selectably engagable, or otherwise insertable into the signal path of the audio mixing console, by the operator of the mixing console through manipulation of one or more control elements, such as switches or potentiometers. In general, it is advantageous for an audio imaging controller to provide a multiple number of imaging modes for processing an audio signal. Further, to avoid complicating the recording process for the operator of the mixing console, it is advantageous to have a minimal number of control elements which must be manually manipulated to attain the desired results.

Examples of currently available image control devices include imaging controls such as those incorporated into the AMEK BCIII or Classic, the NEVE 55 Series, or the Solid State Logic SL-5000M Series mixing consoles. These types of imaging controllers vary in the capabilities and features which they provide. For example, some imaging controls such as the AMEK BCIII, allow a user to vary the image mode of the audio signal from a "stereo" mode to a "mono" mode to a left/right "reversed stereo" mode through manipulation of a single control element, such as a potentiometer. Others, such as the Solid State Logic SL-5000M series, allow for the audio signal image mode to be varied from "stereo" to "mono" to a "reverse" stereo through manipulation of a rotary control element and a separate width control button. Others allow the audio image mode to be varied from a "left/right" to "mono" to "right/left" through manipulation of a single control element. Although these types of image controllers allow the image quality or characteristics to be altered to produce a desired result upon reproduction, those that can be operated through manipulation of a single control element are limited in the number of imaging modes they can provide. Those that can provide a more extensive number of attainable image modes, unfortunately, generally require an operator to manipulate more than one control element. Aside from the disadvantage of having to deal with more than one control element, these additional control elements increase the cost associated with the production of the image controller.

Another type of imaging control device is described in a U.S. patent application entitled *Stereo Image Control Circuit* which was filed on Feb. 25, 1994. Ser. No. 08/202,029 (Attorney of Record: Ronald P. Kananen; Docket No.: S0A-053; Inventor(s): J. Dombrowski and B. Orozov). This application is assigned to the assignee of the present invention and is hereby incorporated herein by reference. This type of image controller allows the image mode of an audio signal to be varied over multiple image modes by manipulating a single control element, such as a rotary potentiometer. In this manner, the image mode of a stereo audio signal can be varied as desired over a range of image modes from "wide" to "stereo" to "mono". FIG. 1 shows a schematic diagram of this type of image controller. While this type of imaging control device provides the clear advantage of multiple image modes and easy use via a single control element, it also uses substantial circuitry and components, such as resisters 1, 2, 3, 4, 5, 6, 7, 8, 9, 10, 11, 12, 13, 14, 15, 16, 17, 18, 19, 20, 21, 22, 23 and 24; potentiometers 25, 26, 27 and 28; and operational amplifiers 29, 30, 31, 32, 33 and 34, to implement.

SUMMARY OF THE INVENTION

It is an object of the present invention to provide for an audio imaging control device which overcomes the above noted shortcomings of common audio imaging control devices. More particularly, the present invention is directed to providing an audio imaging control device wherein multiple image modes may be obtained without the need for manipulation of multiple control elements. Further, the present invention seeks to minimize the complexity of circuitry needed to implement a multi-mode imaging control device.

The present invention provides the advantages of imaging control without the need for manual manipulation of multiple control elements. Further, the minimal requirements for circuitry needed to implement the present invention allows for a cost effective imaging control device. A review of the following description of the invention will make these and other objects, advantages and features of the invention apparent to those skilled in the art.

According to one aspect of the present invention, there is provided a first differential amplifier and a second differential amplifier, each of which have a first and second input and an output. There is provided a first variable resistance coupled between a first channel input terminal and a second channel input terminal for variably controlling the input to the first input of the first differential amplifier. There is provided a second variable resistance coupled between the first channel input terminal and the second channel input terminal for variably controlling a signal input to the first input of the second differential amplifier. Further, there is provided a third variable resistance coupled between the first channel input terminal and the second channel input terminal via a first and a second fixed resistive divider. This third variable resistance is used to variably control the signal input to the second input of the first differential amplifier. There is further provided a fourth variable resistance coupled to the first channel input terminal and the second channel input terminal via the first and the second fixed resistive divider. This fourth variable resistance is utilized to variably control the signal input to the second input of the second differential amplifier. The first, second, third and fourth variable resistors can be coupled so as to be simultaneously variable. These variable resistors may be rotary potentiometers which are coupled so as to be controllable by a single shared rotary control shaft. By rotating this rotary control shaft from an extreme clockwise position through a center, or halfway, position to an extreme counterclockwise position, the image mode of a stereo, or two channel, input signal can be changed from a "wide" mode to a "stereo" mode to a "mono" mode which corresponds to the center, or halfway, point. From the center point, or "mono" mode, the rotary control shaft can be further rotated in the counterclockwise direction to attain a "reverse stereo" mode onto a "reverse wide" mode at the extreme counterclockwise position.

The present invention provides flexibility in stereo imaging by controlling a base between both channels of a stereo audio program by smoothly changing the stereo base from a "0" mono-mode via a "stereo" mode to a larger dimension or "wide" mode which provides for a more spacious or life-like imaging effect. Similarly, the present invention also provides for controlling a base between both channels of the stereo audio program by reversing the orientation of the two input signals and smoothly changing the stereo base from a "0" mono-mode via a "reverse stereo" mode to a "reverse wide" mode, which also provides an enhanced, more life-like imaging quality. Another aspect of the present invention contemplates that the claimed imaging control device can be implemented so as to be manually operable or, so that it can be controlled through automated controllers such as a microcomputer.

The novel features of the present invention are set forth with particularity in the appended claims. The invention itself, however, as to organization and method of operation, together with further objects and advantages thereof, may be best understood by reference to the following detailed description of the invention and accompanying drawings.

DESCRIPTION OF THE INVENTION

Figure 1:
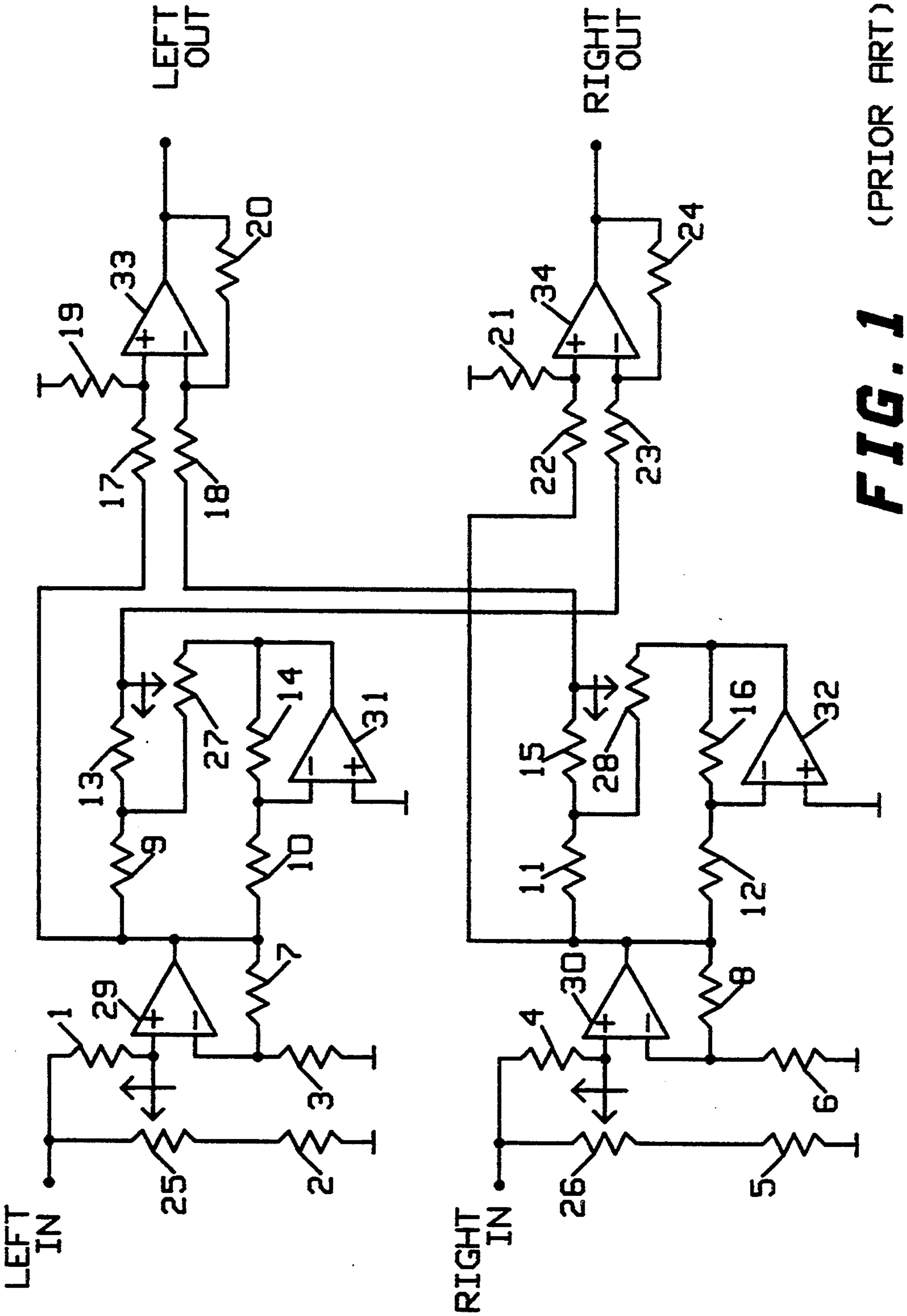
FIG. 1 (PRIOR ART)
FIG. 1 is a schematic diagram showing an imaging control circuit.
Figure 2:
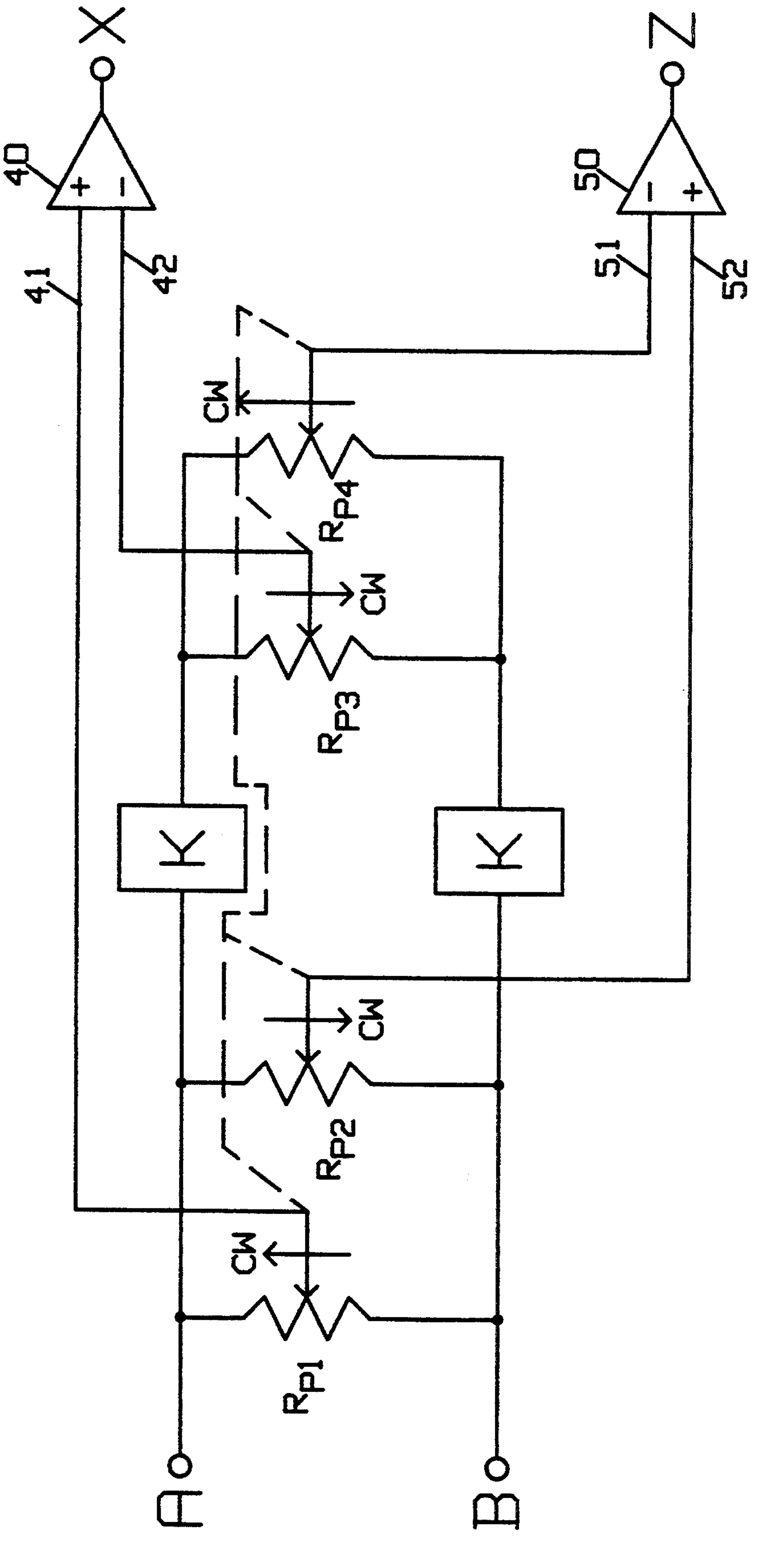
FIG. 2 is a block diagram of one embodiment of the present invention.
Figure 3:
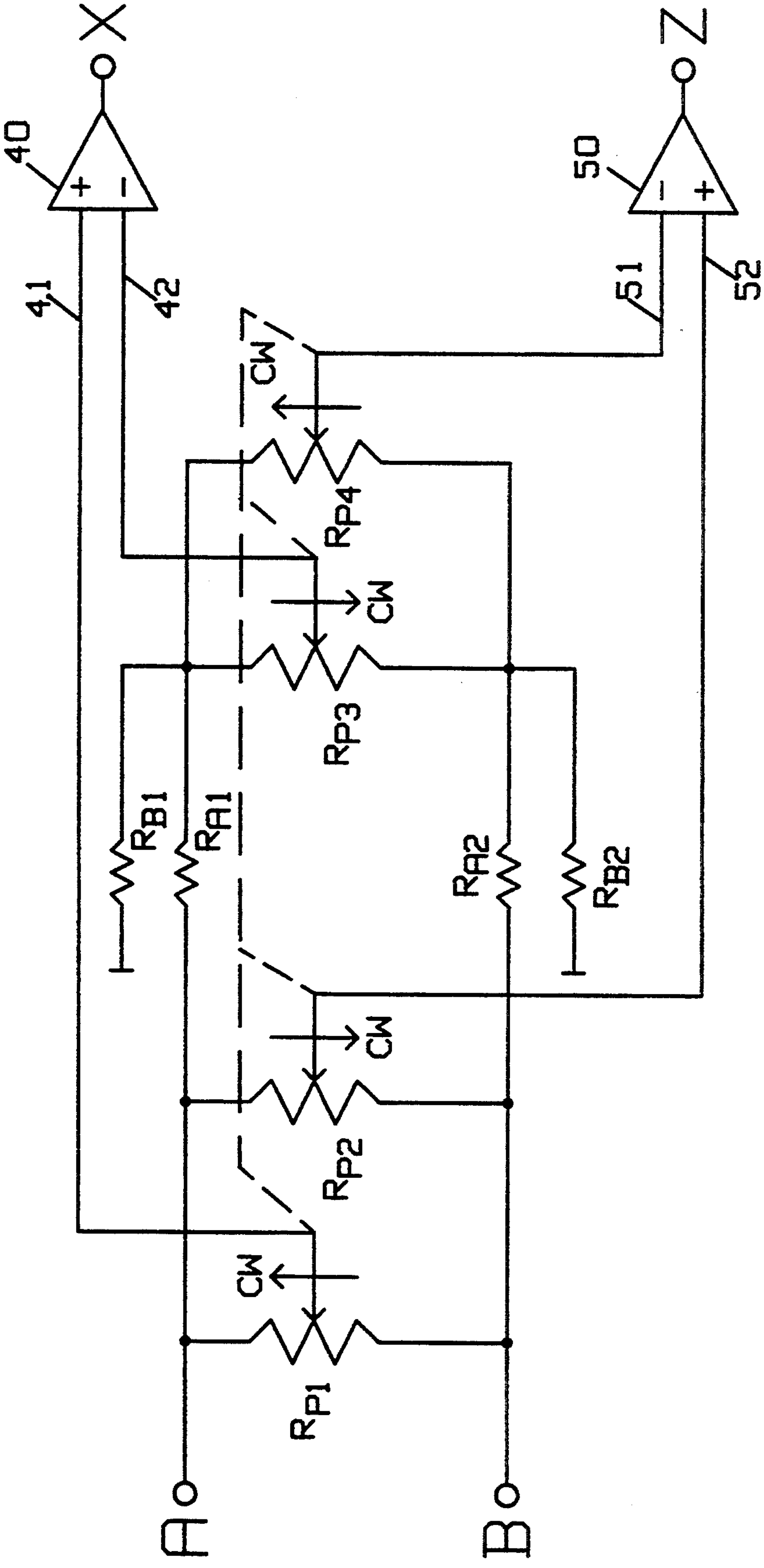
FIG. 3 is a schematic diagram of one implementation of the present invention.
Figure 4:
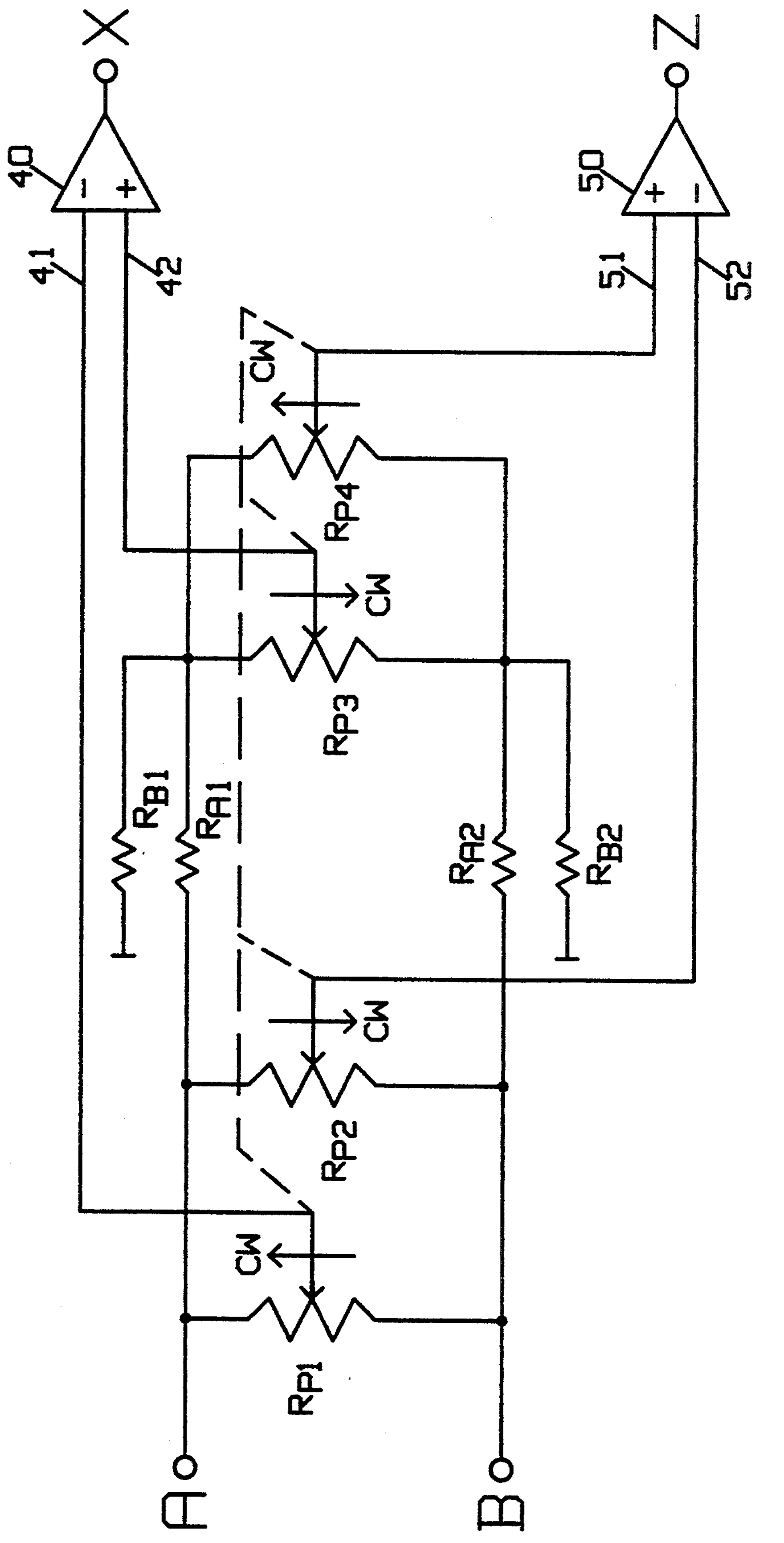
FIG. 4 is a schematic diagram of a second implementation of the present invention.

With reference to FIG. 2, FIG. 3 and FIG. 4, a preferred embodiment of the present invention will be described. This embodiment incorporates a first and a second audio signal path, or channel. The first audio signal channel is defined by a first channel input terminal A and a first channel output terminal X. The second audio signal channel is defined by a second channel input terminal B and a second channel output terminal Z. A first variable resistor $R_{p1}$, having a center tap wiper, is connected across the first channel input terminal A and the second channel input terminal B. The center tap wiper of variable resistor $R_{p1}$ is connected to the input 41 of differential amplifier 40. A second variable resistor $R_{p2}$ is also connected across first channel input terminal A and second channel input terminal B. The center tap wiper of variable resistor $R_{p2}$ is connected to an input 52 of differential amplifier 50. A third variable resistor $R_{p3}$ is connected across the first channel input terminal A and second channel input terminal B via fixed resisters $R_{A1}$ and $R_{A2}$, with $R_{A1}$ connecting one terminal of variable resistor $R_{p3}$ to first input terminal A while fixed resistor $R_{A2}$ connects the other terminal of variable resistor $R_{p3}$ to second channel input terminal B. The center tap wiper of variable resistor $R_{p3}$ is connected to an input 42 of differential amplifier 40. A fourth variable resistor $R_{p4}$ is connected across variable resistor $R_{p3}$ so as to be in parallel therewith. The center tap wiper of variable resistor $R_{p4}$ is connected to the input 51 of differential amplifier 50. A fixed resistor $R_{B1}$ is connected between ground and a connection point between variable resistor $R_{p3}$ and fixed resistor $R_{A1}$. A fourth fixed resistor $R_{B2}$ is connected between ground and a connection point between variable resistor $R_{p3}$ and fixed resistor $R_{A2}$. Differential amplifier 40 outputs a signal to first channel output terminal X. Differential amplifier 50 outputs a signal to second channel output terminal Z. In the preferred embodiment inputs 41 and 52 of differential amplifiers 40 and 50 are non-inverting inputs, while inputs 42 and 51 are inverting. With reference to FIG. 4, it will be noted that inputs 41 and 52 could also be inverting inputs of differential amplifiers 40 and 50 while inputs 42 and 51 are non-inverting.

In the preferred embodiment variable resistors $R_{p1}$, $R_{p2}$, $R_{p3}$ and $R_{p4}$ are preferably linear taper potentiometers of equal resistance values. In the preferred embodiment, these resistance values are 10K ohms. The rotary potentiometers $R_{p1}$, $R_{p2}$, $R_{p3}$ and $R_{p4}$ are ganged together so as to be controllable by rotation of a single potentiometer control shaft. It should be noted that variable resistors $R_{p1}$ and $R_{p3}$ are connected across first channel input terminal A and second channel input terminal B in such a way that as the potentiometer shaft is rotated in a clockwise manner, the D.C. resistance between the center tap wiper and the first channel input terminal A is decreased. Conversely, with regard to variable resistors $R_{p2}$ and $R_{p4}$, these potentiometers are connected across first channel input terminal A and second channel input terminal B in such a way that as the potentiometer shaft is rotated in a clockwise manner, the D.C. resistance between the center tap terminal thereof and first channel input terminal A is increased. Thus, as the D.C. resistance value between the center tap wiper and input terminal A increases in potentiometers $R_{p2}$ and $R_{p4}$ as the potentiometer shaft is rotated clockwise, the D.C. resistance between the center tap wiper and input terminal A decreases in potentiometers $R_{p1}$ and $R_{p3}$.

As to fixed resistors, fixed resistors $R_{A1}$ and $R_{A2}$ are chosen to be of equal values. Further, fixed resistors $R_{B1}$ and $R_{B2}$ are also chosen to be of equal resistance values. The resistance values of $R_{A1}$ and $R_{A2}$ with respect to the resistance values $R_{B1}$ and $R_{B2}$ are chosen so that $0 \leqq [R_B/(R_A+R_B)] < 1$, where $R_B = R_{B1} = R_{B2}$ and $R_A = R_{A1} = R_{A2}$. Although there are a range of resistance values for $R_{A1}$, $R_{A2}$, $R_{B1}$ and $R_{B2}$ which would satisfy the noted limitations, in the preferred embodiment the values of $R_{A2}$, $R_{A2}$, $R_{B1}$, and $R_{B2}$ have been chosen to be 5.1K ohms. With reference to FIG. 2, it will be noted that the transfer function K is equal to $R_B/(R_A+R_B)$.

As to differential amplifiers 40 and 50, any number of differential amplifier configurations could be utilized, however, in the preferred embodiment these differential amplifiers are of standard configuration based upon operational amplifier circuits such as Analog Devices - OP275 operational amplifiers. Of course, it will be recognized that other model I.C. operational amplifiers or discrete component amplifiers could be used to accomplish the objectives and obtain the advantages of the present invention.

Figure 5:
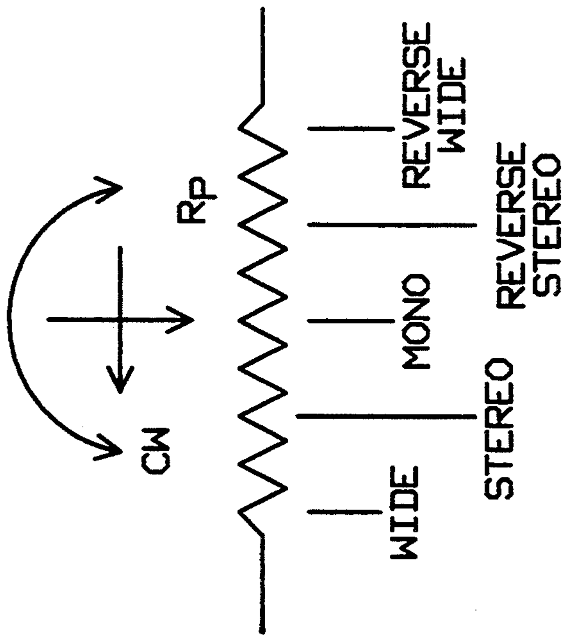
FIG. 5 is an illustration showing the attained image mode in relation to the wiper position of variable resisters $R_{p1}$, $R_{p2}$, $R_{p3}$ and $R_{p4}$.

By rotating the single rotary potentiometer shaft which is shared by variable resistors $R_{p1}$, $R_{p2}$, $R_{p3}$ and $R_{p4}$, various imaging modes can be attained. FIG. 5 shows the attainable image modes for the preferred embodiment, relative to the approximate position of the single rotary control shaft on which all four variable resistors $R_{p1}$, $R_{p2}$, $R_{p3}$ and $R_{p4}$ are ganged so as to share the same rotary control shaft. It can be seen that in the preferred embodiment, when the rotary control shaft is rotated to an extreme, or full, clockwise position, a wide image mode is attained. When the rotary control shaft of the potentiometer is turned to an extreme counter clockwise position, a reverse wide mode is attained. Rotating the control shaft to an approximate center position allows a mono mode to be achieved. Further, by positioning the rotary control shaft at a point substantially mid-way between the center position and the full clockwise position, a stereo mode is achieved. Likewise, rotation of the control shaft to a point substantially mid-way between the center point and the full counterclockwise position results in a reverse stereo mode.

The transfer ratios on outputs X and Z for various imaging modes and uniphase signals are more fully described in TABLE A below. It should be noted that $L_{out}$ = the output of differential amplifier 40 at first channel output terminal X; $R_{out}$ = the output of differential amplifier 50 at second channel output terminal Z; $L_{In}$ = the signal input to first channel input terminal A; $R_{In}$ = the signal input to second channel input terminal B; and $K = R_B/(R_A+R_B)$, where $0 \leqq [R_B/(R_A+R_B)] < 1. R_B = R_{B1} = R_{B2}$ and $R_A = R_{A1} = R_{A2}$. In order to keep the overall signal output level at X and Z relatively uniform across each of the different image modes, it is preferable to have $K = R_B/(R_A+R_B) = 0.5$ with $R_A = R_B$.

TABLE A

| Image Mode | Characteristics |
|---|---|
| Wide | $L_{Out} = L_{In} - K(R_{In})$ |
| | $R_{Out} = R_{In} - K(L_{In})$ |
| Stereo | $L_{Out} = L_{In}$ |
| | $R_{Out} = R_{In}$ |
| Mono | $L_{Out} = R_{Out} = (R_{In} + L_{In})(1\text{-}K)$ |
| Reverse Stereo | $L_{Out} = R_{In}$ |
| | $R_{Out} = L_{In}$ |
| Reverse Wide | $L_{Out} = R_{In} - K(L_{In})$ |
| | $R_{Out} = L_{In} - K(R_{In})$ |

Figure 6:
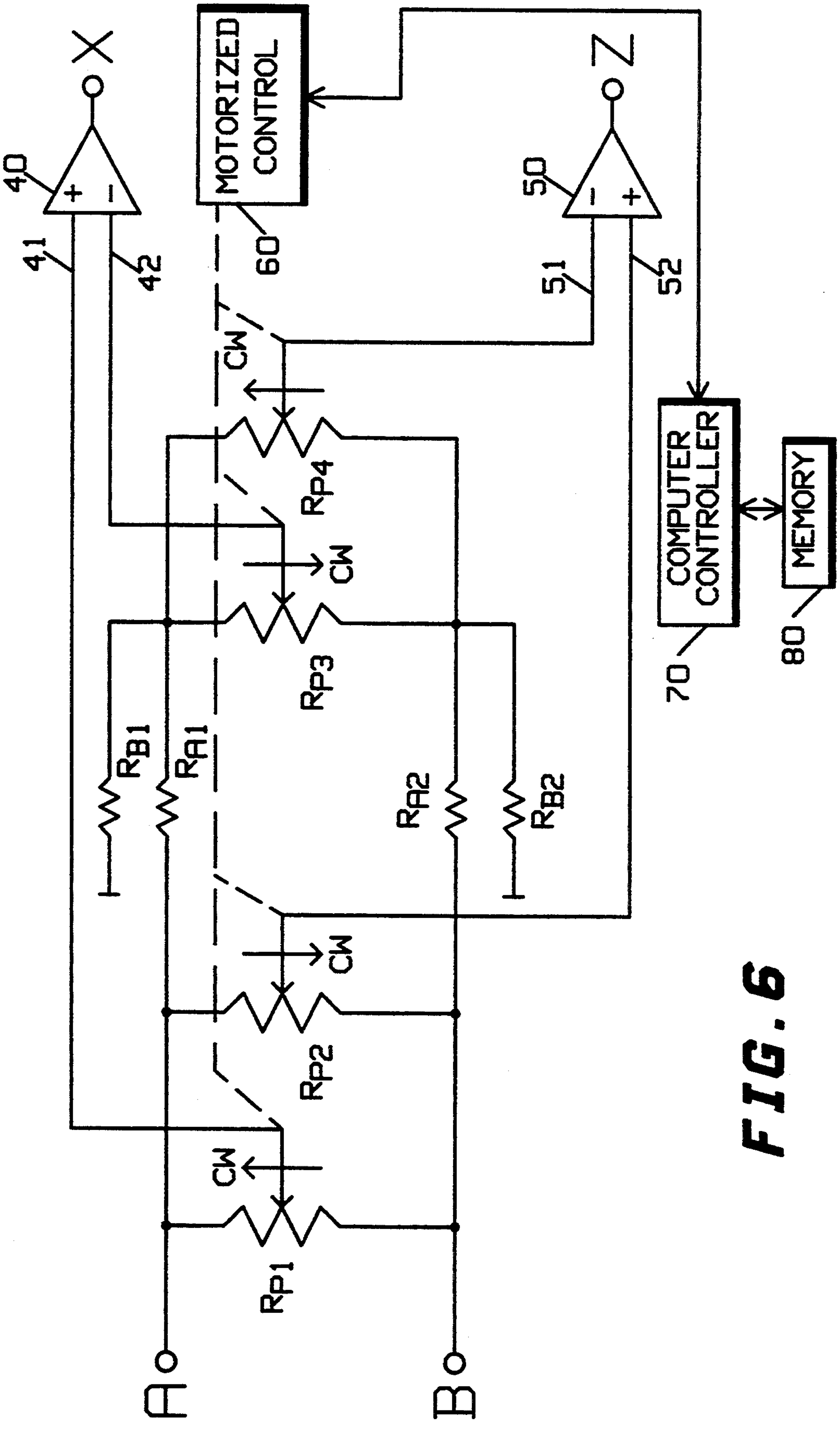
FIG. 6 is a block diagram of a second embodiment of the present invention.
Figure 7:
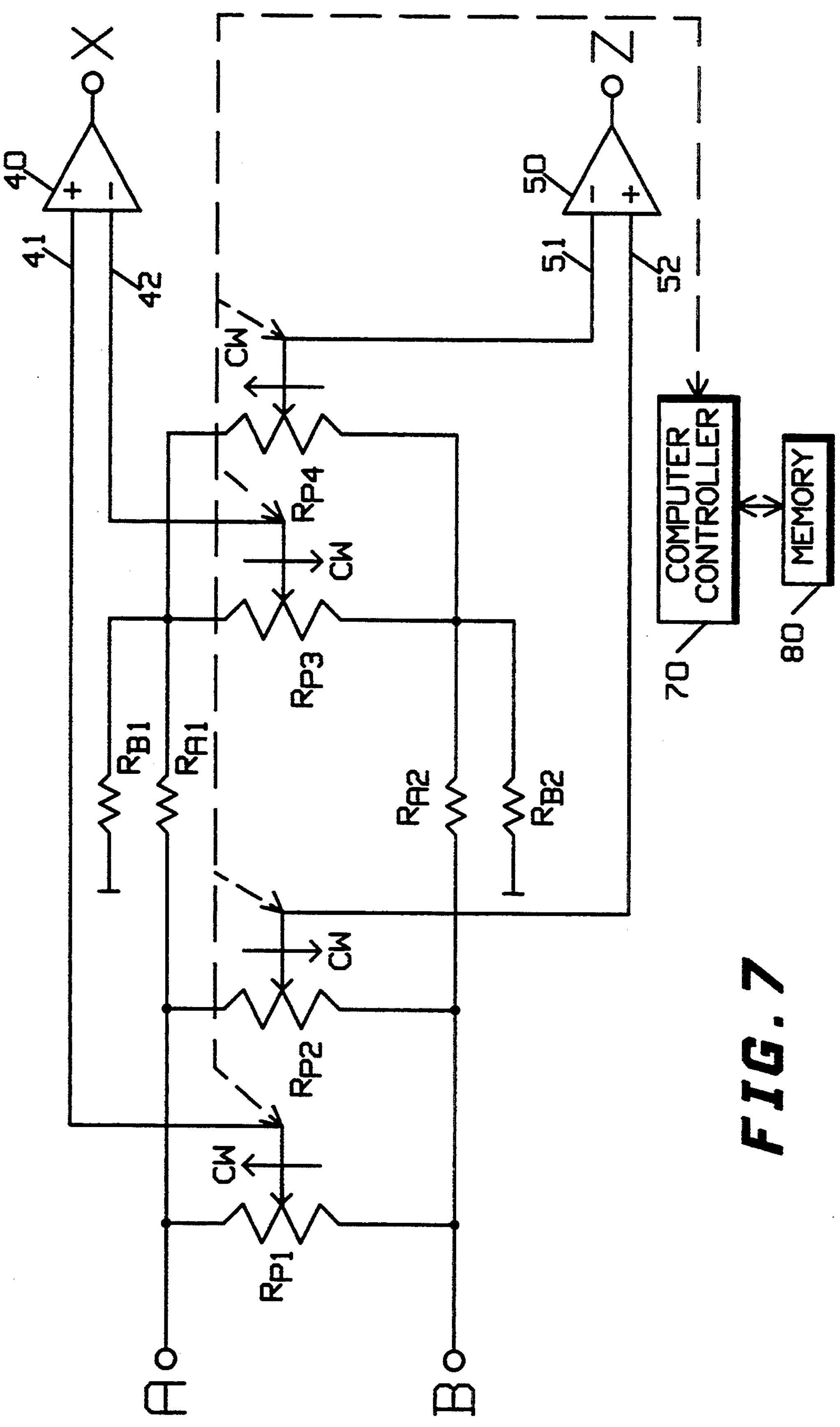
FIG. 7 is a block diagram of a third embodiment of the present invention.

It will be recognized that variable resistors $R_{p1}$, $R_{p2}$, $R_{p3}$ and $R_{p4}$ may take many forms including, but not limited to, rotary potentiometers, or linear track-type slider resistors or computer controlled resistor packs. With reference to FIG. 6, it will be noted that the present invention contemplates that the variable resistors $R_{p1}$, $R_{p2}$, $R_{p3}$ and $R_{p4}$ could be equipped with a motorized control element 60 which would vary, or adjust, a mechanical setting thereof so as to vary the attained image mode upon actuation of the motorized control element. Such a motorized control mechanism would lend itself to a further embodiment of the present invention wherein adjustments to variable resistors $R_{p1}$, $R_{p2}$, $R_{p3}$ or $R_{p4}$ could be accomplished through computerized controller 70 without the need for manual manipulation. More particularly, control information could be, for example, stored in memory 80 and subsequently recalled so as to effect the desired "image mode", or variable resistor settings, which are represented by the information stored in memory. In the case where variable resistors $R_{p1}$, $R_{p2}$, $R_{p3}$ and $R_{p4}$ are computer controlled resistor packs, or the like, computerized controller 70 could be used to control such variable resistors as illustrated in FIG. 7. It will be recognized by those skilled in the art that many other variations of the present invention can be made without departing from the spirit and scope of the claims.

What is claimed is:

1. An Audio image control device comprising:

a first channel input terminal;

a second channel input terminal;

first and second differential amplifiers each comprising a first input, a second and an output;

first, second, third and fourth potentiometers each comprising a first terminal, a second terminal and a center tap terminal;

said first terminal of said first potentiometer is connected to said first channel input terminal;

said second terminal of said first potentiometer is connected to said second channel input terminal;

said center tap terminal of said first potentiometer is connected to said first input of said first differential amplifier;

said first terminal of said second potentiometer is connected to said first channel input terminal;

said second terminal of said second potentiometer is connected to said second channel input terminal;

said center tap terminal of said second potentiometer is connected to said first input of said second differential amplifier;

a first resistor having a first terminal connected to said first channel input terminal and a second terminal connected to said first terminal of said third potentiometer;

a second resistor having a first terminal connected to said second channel input terminal and a second terminal connected to said second terminal of said third potentiometer;

said center tap terminal of said third potentiometer is connected to said second input of said first differential amplifier;

said first terminal of said fourth potentiometer is connected to said first terminal of said third potentiometer;

said second terminal of said fourth potentiometer is connected to said second terminal of said third potentiometer;

said center tap terminal of said fourth potentiometer is connected to said second input of said second differential amplifier;

a third resistor having a first terminal connected to said first terminal of said third potentiometer and a second terminal connected to ground;

a fourth resistor having a first terminal connected to said second terminal of said third potentiometer and a second terminal connected to ground;

the values of said first resistor and said second resistor are equal;

the values of said third resistor and said fourth resistor are equal; and where the value of said first resistor is R1 and the value of said third resistor is R3, then $0 \leqq [R3/(R1+R3)] < 1$.

2. An audio image control device according to claim 1 wherein said first input of said first and second differential amplifiers is a non-inverting input and said second input of said first and second differential amplifiers is an inverting input.

3. An audio image control device according to claim 1 wherein said first input of said first and second differential amplifiers is an inverting input and said second input of said first and second differential amplifiers is a non-inverting input.

4. An audio image control device according to claim 1 wherein said first, second, third and fourth potentiometers are ganged together on a single control shaft so that they may be simultaneously varied.

5. An audio image control device according to claim 1 further comprising a motorized actuator for actuating said first, second, third and fourth potentiometers.

6. An audio image control device according to claim 5, further comprising a controller means for controlling said motorized actuator in response to a control signal.

7. An audio image control device according to claim 6 further comprising a memory device for storing control signal data for said controller means.

8. An audio imaging control device comprising:

a first channel input terminal;

a second channel input terminal;

first amplifier means for amplifying an audio signal;

second amplifier means for amplifying an audio signal;

said first and second amplifier means each comprising a first and second input;

first variable resistance means coupled between said first channel input terminal and said second channel input terminal for variable connecting said first input of said first amplifier means to said first and second channel input terminals;

second variable resistance means coupled between said first input terminal and said second input terminal for variably connecting said first input of said second amplifier means to said first and second channel input terminals;

third variable resistance means for variably connecting said second input of said first amplifier means to said first and second channel input terminals via a first and second fixed resistor; and, fourth variable resistance means for variably connecting said second input of said second amplifier means to said first and second channel input terminals via said first and second fixed resistor, wherein said first, second, third, and fourth variable resistance means share a single common rotary control shaft.

9. An audio imaging control device according to claim 8 wherein said first, second, third and fourth variable resistance means comprise rotary potentiometers.

10. An audio imaging control device according to claim 9 wherein said first, second, third and fourth variable resistance means comprise computer controlled resistance means.

11. An audio imaging control device according to claim 10 further comprising controller means for variably controlling said computer controlled resistance means in accordance with an operator initiated control signal.

12. An audio imaging control device according to claim 11 further comprising storage means for storing control signal data.

13. An audio imaging control device comprising:

a first channel input terminal;

a second channel input terminal;

first amplifier means for amplifying audio signals;

second amplifier means for amplifying audio signals;

said first and second amplifier means each comprise a first input, a second input and an output;

first, second, third and fourth variable resistance means each comprising a first terminal, a second terminal and a variable center tap;

said first variable resistance means for variably controlling the input to said first input of said first amplifier means;

said second variable resistance means for variably controlling the input to said first input of said second amplifier means;

said third variable resistance means for variably controlling the input to said second input of said first amplifier means;

said fourth variable resistance means for variably controlling the input to said second input of said second amplifier means;

said first terminals of said first and third variable resistance means are coupled to said first channel input terminal, said second terminals of said first and third variable resistance means are coupled to said second channel input terminal;

said second terminals of said second and fourth variable resistance means are coupled to said first channel input terminal, said first terminals of said second and fourth resistance means are coupled to said second channel input terminal;

said variable center tap of said first variable resistance means is coupled to said first input of said first amplifier means;

said variable center tap of said second variable resistance means is coupled to said first input of said second amplifier means;

said variable center tap of said third variable resistance means is coupled to said second input of said first amplifier means; and said variable center tap of said fourth variable resistance means is coupled to said second input of said second amplifier means.

14. An audio imaging control device comprising:

a first channel input terminal;

a second channel input terminal;

first amplifier means for amplifying audio signals;

second amplifier means for amplifying audio signals;

said first and second amplifier means each comprise a first input, a second input and an output;

first, second, third and fourth variable resistance means each comprising a first terminal, a second terminal and a center tap;

said first variable resistance means for variably controlling the input to said first input of said first amplifier means;

said second variable resistance means for variably controlling the input to said first input of said second amplifier means;

said third variable resistance means for variably controlling the input to said second input of said first amplifier means;

said fourth variable resistance means for variably controlling the input to said second input of said second amplifier means;

said first terminals of said first and third variable resistance means are coupled to said first channel input terminal, said second terminals of said first and third variable resistance means are coupled to said second channel input terminal; and said second terminals of said second and fourth variable resistance means are coupled to said first channel input terminal, said first terminals of said second and fourth resistance means are coupled to said second channel input terminal.

15. An audio image controller according to claim 14 wherein:

said variable center tap of said first variable resistance means is coupled to said first input of said first amplifier means;

said variable center tap of said second variable resistance means is coupled to said first input of said second amplifier means;

said variable center tap of said third variable resistance means is coupled to said second input of said first amplifier means; and said variable center tap of said fourth variable resistance means is coupled to said second input of said second amplifier means.

16. An audio image control device according to claim 14 wherein said first, second, third and fourth variable resistance means comprise rotary potentiometers.

17. An audio imaging control device according to claim 14 wherein said first, second, third and fourth variable resistance means further comprise potentiometers which share a single common rotary control shaft.

18. An audio imaging control device according to claim 14 further comprising a motorized actuator means for controlling said first, second, third and fourth variable resistance means.

19. An audio imaging control device according to claim 18 further comprising:

controller means for controlling said motorized actuator means; and storage memory for storing control data for said controller means.

20. An audio imaging control device according to claim 19 wherein said controller means is a microprocessor.

21. An audio image control circuit, comprising in combination:

first and second differential amplifiers, each comprising an inverting input and a non-inverting input and an output;

input means for receiving first and second audio signals;

first control means for controlling a mixture of said first and second audio signals applied to said non-inverting inputs of said first and second differential amplifiers, so that a proportion of said first audio signal which is applied to said non-inverting input of said first differential amplifier is equal to a proportion of said second audio signal applied to said non-inverting input of said second differential amplifier;

first and second signal divider networks for dividing said first and second audio signals respectively to produce first and second divided signals;

second control means for controlling a mixture of said first and second divided signals applied to said inverting inputs of said first and second differential amplifiers, so that a proportion of said first divided signal which is applied to said inverting input of said first differential amplifier is equal to a proportion of said second divided signal applied to said inverting input of said second differential amplifier; and wherein, said first and second control means are coupled so that said mixtures of said divided signals and said audio signals are simultaneously controllable.

22. An audio image control circuit, comprising in combination:

first and second differential amplifiers, each comprising a first input and a second input and an output;

input means for receiving first and second audio signals;

first control means for controlling a mixture of said first and second audio signals applied to said first inputs of said first and second differential amplifiers, so that a proportion of said first audio signal which is applied to said first input of said first differential amplifier is equal to a proportion of said second audio signal applied to said first input of said second differential amplifier;

first and second signal divider networks for dividing said first and second audio signals respectively to produce first and second divided signals;

second control means for controlling a mixture of said first and second divided signals applied to said second inputs of said first and second differential amplifiers, so that a proportion of said first divided signal which is applied to said second input of said first differential amplifier is equal to a proportion of said second divided signal applied to said second input of said second differential amplifier; and wherein, said first and second control means are coupled so that said mixtures of said divided signals and said audio signals are simultaneously controllable.

23. An audio imaging control circuit according to claim 22, wherein said first inputs of said first and second differential amplifiers comprise non-inverting inputs and said second inputs of said first and second differential amplifiers comprise inverting inputs.

24. An audio imaging control circuit according to claim 22, wherein said first inputs of said first and second differential amplifiers comprise inverting inputs and said second inputs of said first and second differential amplifiers comprise non-inverting inputs.

25. An audio imaging control device comprising:

a first channel input terminal;

a second channel input terminal;

a first amplifier for amplifying an audio signal;

a second amplifier for amplifying an audio signal;

said first and second amplifier means each comprising a first and second input;

a first variable resistor coupled between said first channel input terminal and said second channel input terminal for variably connecting said first input of said first amplifier to said first and second channel input terminals;

a second variable resistor coupled between said first input terminal and said second input terminal for variably connecting said first input of said second amplifier to said first and second channel input terminals;

a third variable resistor for variable connecting said second input of said first amplifier to said first and second channel input terminals via a first and second fixed resistor; and, a fourth variable resistor for variable connecting said second input of said second amplifier to said first and second channel input terminals via said first and second fixed resistor, wherein said first, second, third, and fourth variable resistance means share a common rotary control shaft.

* * * * *